MAGNETIC AMPLIFIER FOR LOW-LEVEL INPUT SIGNALS

Filed July 9, 1964 2 Sheets-Sheet 1

INVENTORS
Fumiyuki Inose
Hiroshi Motozumi
Kyo Suda
Toshio Numakura
Ryutaro Mori

Marlow & Western

MAGNETIC AMPLIFIER FOR LOW-LEVEL INPUT SIGNALS

Filed July 9, 1964 2 Sheets-Sheet 2

*INVENTORS*
FUMIYUKI INOSE
HIROSHI MOROZUMI
KYO SUDA
TOSHIO NUMAKURA
RYUTARO MORI

United States Patent Office 3,402,359

Patented Sept. 17, 1968

3,402,359

MAGNETIC AMPLIFIER FOR LOW-LEVEL INPUT SIGNALS

Fumiyuki Inose, Hachioji-shi, Hiroshi Morozumi, Tokyo-to, Kyo Suda, Hachioji-shi, and Toshio Numakura and Ryutaro Mori, Kodaira-shi, Japan, assignors to Kabushiki Kaisha Hitachi Seisakusho, Tokyo-to, Japan, a joint-stock company Filed July 9, 1964, Ser. No. 381,323

Claims priority, application Japan, July 13, 1963, 38/38,298

1 Claim. (Cl. 330—8)

ABSTRACT OF THE DISCLOSURE

A magnetic amplifier having a single core and a gating switch connected in the gate winding circuit provides a push-pull characteristics for low-level input signals.

Figure 1A:
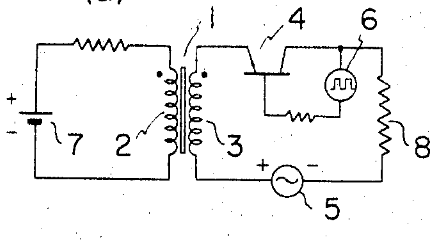

This invention relates to magnetic amplifiers and to push-pull circuits, and more particularly it relates to a new magnetic amplifier for amplifying low-level input signals.

It is an object of the invention, in its broader aspects, to reduce drift and, at the same sime in accordance with necessity, to obtain push-pull characteristics corresponding to the polarity of a control voltage by means of a single core.

In general, in a magnetic amplifier of heretofore known type, it is necessary to use two or four cores and an equal number of rectifiers in order to obtain push-pull characteristics. The use of a large number of parts in this manner not only entails complexity and high cost of the circuit but also becomes a cause of drift. Particularly for the purpose of reducing drift caused by supply voltage variations and temperature fluctuations, it is necessary to match and unify the characteristics of the parts used. The state of the art, however, has faced certain limits whereby the amplification of low-level input signals has been difficult.

It is an object of the invention to overcome this difficulty.

More specifically, it is an object to provide a magnetic amplifier for low-level input signals wherein push-pull characteristics can be obtained with a single core, depending on the necessity, whereby the drift due to the non-uniform characteristics of the cores in a conventional circuit arrangement can be eliminated.

It is another object to provide a magnetic amplifier of the above stated character wherein drift due to supply voltage variations and due to temperature fluctuations are substantially reduced.

Figure 1B:
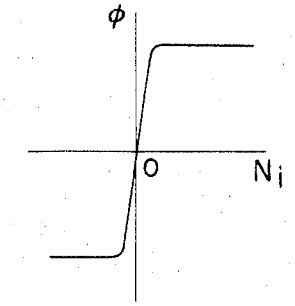
Figure 3:
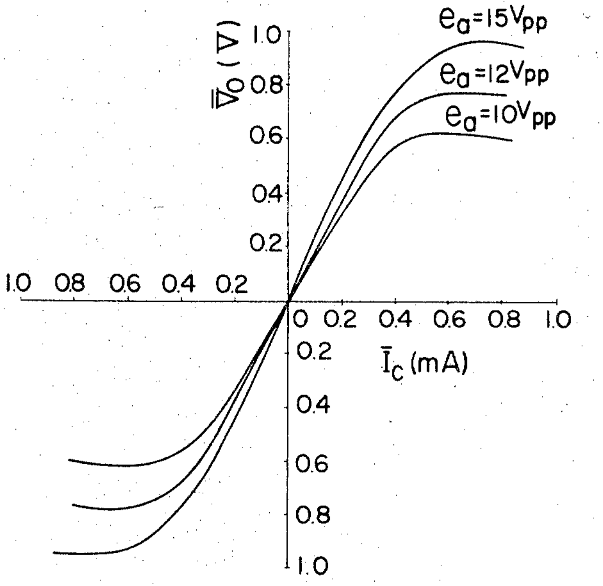
Figure 2A:
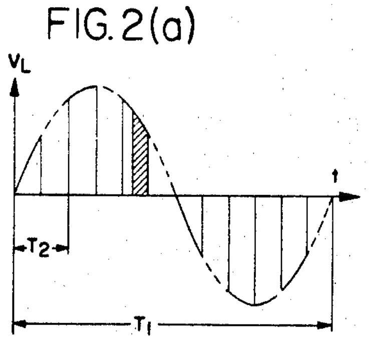
Figure 2D:
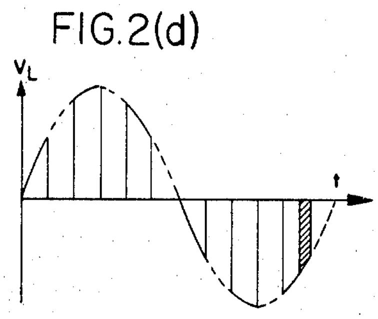
Figure 2B:
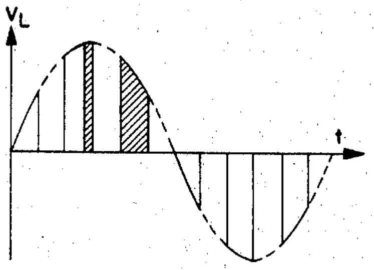
Figure 2E:
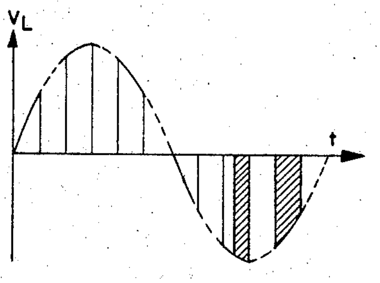
Figure 2C:
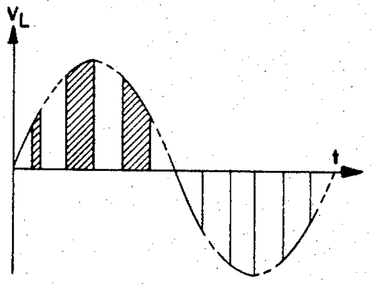
Figure 2F:
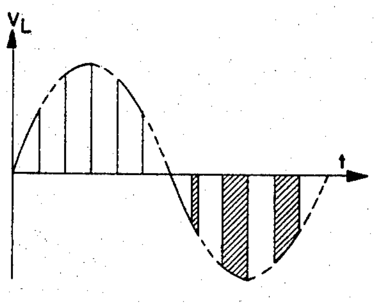

The nature, principle, and details of the invention will be best understood by references to the following description of preferred embodiments of the invention when taken in conjunction with the accompanying drawings wherein like parts are designated by like reference characters, in which:

FIG. 1(*a*) is a circuit diagram showing one embodiment of this invention; FIG. 1(*b*) is a B–H characteristics curve of a magnetic core used in the embodiment of FIG. 1(*a*); FIGS. 2(*a*)–2(*f*) show wave-forms of the exciting voltage and of the output voltage of the embodiment in different operating stages; and FIG. 3 shows the relation between input current and output current in the magnetic amplifier shown in FIG. 1.

In one embodiment of the invention as shown in FIG. 1(*a*), the circuit of the magnetic amplifier has a core 1 around which is wound a control winding 2 and a gate winding 3. The core 1 is one which has a steep saturation magnetization as indicated in FIG. 1(*b*). The circuit is further provided with a transistor 4 for switching, an exciting voltage source 5, a switching voltage supply 6, a control input voltage source 7, and a load resistance 8. Alternatively, in place of the switching transistor 4, an element such as a silicon control rectifying (SCR) element, an ignitron, or a grid control mercury rectifier may be used.

The operation of the illustrated embodiment is as follows: At first, assuming that an input is so supplied to the control winding 2 of the magnetic core 1 as to generate a flux which is superposed on a flux generated by the gate winding during the positive half cycle of the exciting voltage, then during the positive half cycle of the exciting voltage no output will appear so long as the sum of the time integrals of the voltages across the gate winding 3 and the control winding 2, respectively, is smaller than $K\varphi_s$ (wherein K denotes a constant and $\varphi_s$ denotes the saturation flux of core 1). Whereas, when the sum becomes equal to $k\varphi_s$, the core will be saturated so that the impedance of the gate winding 3 will be decreased to substantially zero thus the exciting voltage appears across the load resistance 8.

FIG. 2(*a*) shows a wave-form to explain the above-described operation, wherein only the shaded portions of the exciting voltage intermittently interrupted by the switching transistor will appear across the load resistance 8, whereas the non-shaded portions will be consumed by the winding 3 so that they will not appear as the output. As the input voltage increases, the time instant at which the core 1 becomes saturated is advanced so that the voltage of the shaded portion, i.e. the output voltage $V_L$ will be increased as shown in FIGS. 2(*b*) and 2(*c*).

Under application of the input of such polarity as described above during the negative half cycle of the exciting voltage, the fluxes produced by the windings 2 and 3, respectively, will cancel each other. As a result, during this period, the time integral of the voltage does not reach $k\varphi_s$, hence no output appears. Conversely, when the flux produced by the input voltage and that produced by the positive half cycle of the exciting voltage cancel each other, no output is produced during positive half cycles but a voltage shown by the shaded portion of FIG. 2(*d*) is obtained during negative half cycles. Similarly, the output voltage increases with the input voltage as shown by FIGS. 2(*e*) and 2(*f*).

In one instance of actual measurement of control characteristics, measurements were carried out with a circuit of the arrangement shown in FIG. 1(*a*) under the condition of a switching voltage of a frequency of 400 cycles/sec. from the source 6, an exciting voltage of a frequency of 50 cycles/sec. from the supply 5, a control winding 2 of 350 winding turns, a gate winding 3 of 500 winding turns, a load resistance of 500 ohms, and a core 1 of Senpermax, for various values of exciting voltage $e_a$. The results obtained are indicated in FIG. 3 in which the abscissa represents control input current $\bar{I}_c$, the ordinate represents output voltage $\bar{V}_o$, and $e_a$ denotes exciting voltage. It is to be observed from these results that, in the case of this circuit, in the range corresponding to a control current $\bar{I}_c$ of the order of from zero to ±0.4 milliamperes, substantially good linearity is obtained.

It should be understood, of course, that the foregoing disclosure relates to only a preferred embodiment of the invention and that it is intended to cover all changes and modifications of the examples of the invention herein chosen for the purposes of the disclosure, which do not constitute departures from the spirit and scope of the invention as set forth in the appended claim.

We claim:

1. A magnetic amplifier for low-level output signals comprising: a single core having saturation magnetization characteristics; a control winding and a gate winding wound about the core; means for applying a control input signal to the control winding; means for generating an exciting signal; a load connected in series with said exciting signal generating means and said gate winding; a switching transistor having an emitter and collector which are connected in series with the load, the exciting signal generating means and the gate winding, thus forming a loop; and means for generating a switching voltage supplied to the base electrode of said transistor so as to intermittently impress the exciting signal on the series circuit of said load and gate winding, the switching voltage having an alternating frequency higher than that of the exciting signal, thereby obtaining an output signal in accordance with the input signal across the load.

References Cited

UNITED STATES PATENTS

| | | |
|---|---|---|
| 3,029,376 | 4/1962 | Manteuffel. |
| 3,176,243 | 3/1965 | Meier. |
| 3,210,689 | 10/1965 | Burwen. |
| 3,291,999 | 12/1966 | Lipman. |

ROY LAKE, *Primary Examiner.*

N. KAUFMAN, *Examiner.*